UNITED STATES PATENT OFFICE.

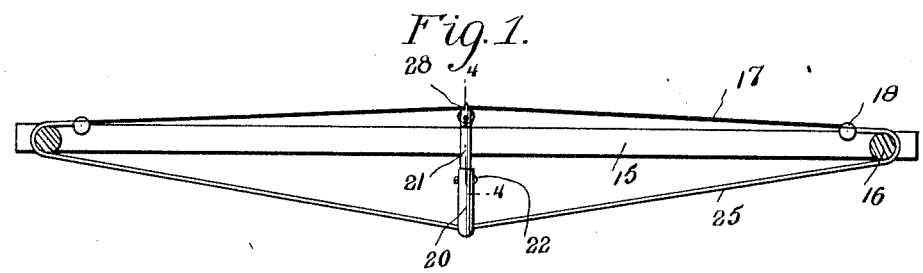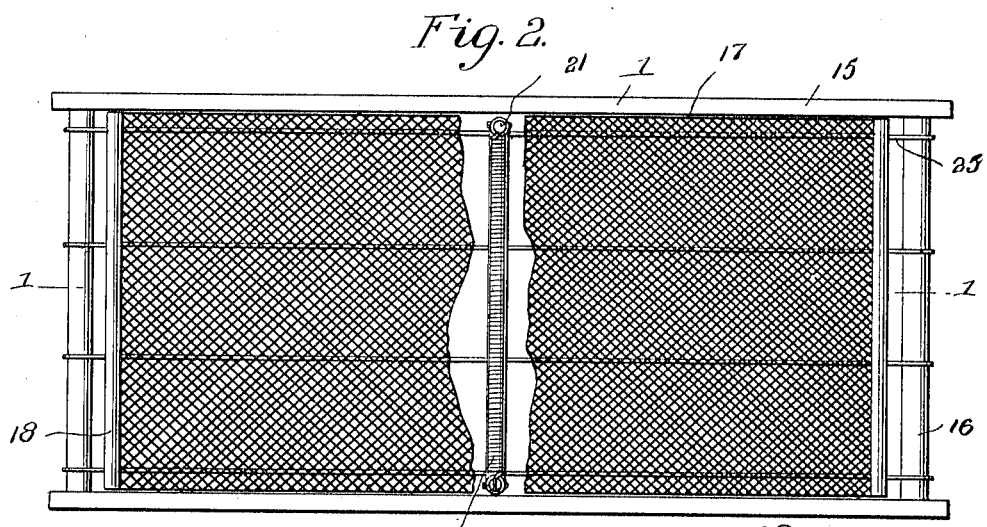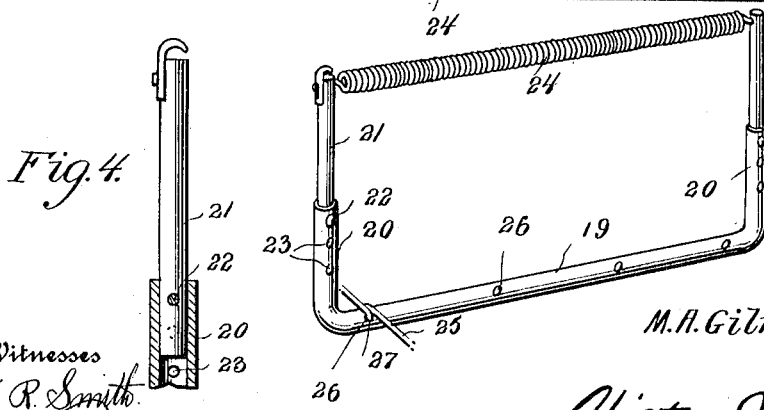

MARY A. GILMOUR, OF DETROIT, MICHIGAN.

BED-SPRING TIGHTENER.

1,096,710.

Specification of Letters Patent.

Patented May 12, 1914.

Application filed December 27, 1913. Serial No. 809,001.

*To all whom it may concern:*

Be it known that I, MARY A. GILMOUR, a citizen of the United States, residing at Detroit, in the county of Wayne and State of Michigan, have invented new and useful Improvements in Bed-Spring Tighteners, of which the following is a specification.

This invention relates to bed springs, and it has particular reference to an improved tightening device whereby the surface of the spring will be maintained in a taut condition and prevented from sagging to an undesirable extent under the weight imposed thereon.

A further object of the invention is to produce a simple and efficient device for counteracting the sagging and for taking up the slack in bed springs.

A further object of the invention is to produce a simple and efficient device whereby slack occasioned by wear may be taken up and the bed spring restored to a tight and useful condition.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a longitudinal sectional view of a bed spring constructed in accordance with the invention taken substantially on the line 1—1 in Fig. 2. Fig. 2 is a top plan view with a portion of the spring fabric broken away. Fig. 3 is a perspective detail view of the tightening device detached. Fig. 4 is a sectional detail view, enlarged, taken on the line 4—4 in Fig. 1.

Corresponding parts in the several figures are denoted by like characters of reference.

The rectangular frame of the improved spring is composed of side members 15 and end members 16, the latter being preferably of round or cylindrical shape, as shown. The spring fabric 17 which may be of any desired construction is terminally attached to and connected with rigid end members 18 which are preferably of a length not exceeding the distance between the inner faces of the side members 15 and the frame.

The tightener is composed of a cross bar 19 which may be a tubular structure and the ends of which are bent to form upwardly extending sockets 20 for the reception of rods or followers 21 which may be secured at various adjustments in said sockets by means of transverse fastening members, such as pins 22, for the passage of which each socket is provided with a plurality of apertures 23. The rods or followers 21 are connected together by a strong coiled spring 24.

Attached to and connected with the end members 18 are flexible elements, such as wires, cables or the like 25, which are guided over the end members 16 of the frame and which are suitably connected with the cross bar 19 of the tightener, which latter is positioned transversely of the frame about midway between the ends thereof beneath the spring fabric 17 which is supported on the coiled spring 24. The cross bar 19 may be provided with apertures 26 for the passage of the flexible elements 25, but the latter may be wound about the cross bar 19 to prevent displacement of the latter, as indicated at 27 in Fig. 3. The spring fabric 17 may also be connected with the upper ends of the follower rods 21 or with the coiled spring 24, or with both, of said elements in order to prevent displacement of the tightener with respect to the spring fabric; such connection may be established by means of a tie wire, as indicated at 28 in Fig. 1.

It is evident that by the construction herein described, the tightener which is supported on the flexible elements 25 will exert an upward pressure against the underside of the fabric 17, keeping the latter in a somewhat arched condition, as seen in Fig. 1, and resisting the tendency to sag under such load as may be imposed thereon. It will not, however, be prevented from yielding to such load and from retaining a desirable degree of flexibility, the transversely disposed and terminally supported coiled spring 24 serving to reinforce the fabric in a yieldable manner. In such slight longitudinal movement as may be occasioned by the flexible elements 25 during the operation of the device, said flexible elements will be guided over the rounded end members 16 of the frame.

When, owing to continued use, the spring fabric 17 becomes slack, tightness may be restored by moving the follower rods 21 upward in their sockets so as to increase the distance between the cross bar 19 and the coiled spring 24.

The consensus of opinion among the medical fraternity of the present day is to the effect that spinal diseases and other ailments are frequently induced and promoted by the use of unduly sagging bed springs. By the improved construction herein described, this objection will be done away with, and a spring is produced which may be always maintained in a taut and non-sagging condition.

Having thus described the invention, what is claimed as new, is:—

1. In a bed spring, a frame, a spring fabric having rigid end bars, flexible elements guided over the end bars of the frame and connected with the end bars of the fabric, and a spacing member interposed between the flexible elements and the fabric, said spacing member including a coiled spring that extends transversely beneath the fabric.

2. In a bed spring, a rectangular frame having rounded end members, a spring fabric having rigid end bars, flexible elements terminally connected with said end bars and guided over the end members of the frame, a cross bar supported on the flexible elements and having upwardly extending socket members, follower rods in said socket members and a coiled spring connecting the follower rods and extending transversely beneath the spring fabric.

3. In a device of the class described, a rectangular frame having end members, a spring fabric having rigid end bars, a cross bar having upwardly extending end members, flexible elements threaded through the cross bar and connected terminally with the rigid end bars of the spring fabric, said flexible elements being guided over the end members of the frame, and a coiled spring extending beneath the spring and supported by the upwardly extending end members of the cross bar.

In testimony whereof I affix my signature in presence of two witnesses.

MARY A. GILMOUR.

Witnesses:
WILLIAM GLATZ,
CHARLIE E. HILL.

---

Copies of this patent may be obtained for five cents each, by addressing the "Commissioner of Patents, Washington, D. C."